United States Patent
Wang

(10) Patent No.: US 9,083,167 B2
(45) Date of Patent: Jul. 14, 2015

(54) CABLE STRIPPING DEVICE

(75) Inventor: Hua-Shuai Wang, Shenzhen (CN)

(73) Assignees: HONG FU JIN PRECISION INDUSTRY (ShenZhen) CO., LTD., Shenzhen (CN); HON HAI PRECISION INDUSTRY CO., LTD., New Taipei (TW)

(*) Notice: Subject to any disclaimer, the term of this patent is extended or adjusted under 35 U.S.C. 154(b) by 507 days.

(21) Appl. No.: 13/467,122

(22) Filed: May 9, 2012

(65) Prior Publication Data

US 2013/0055857 A1 Mar. 7, 2013

(30) Foreign Application Priority Data

Sep. 2, 2011 (CN) .......................... 2011 1 0258325

(51) Int. Cl.
*H02G 1/12* (2006.01)

(52) U.S. Cl.
CPC ............. *H02G 1/126* (2013.01); *H02G 1/1265* (2013.01)

(58) Field of Classification Search
CPC ... G02B 6/245; H02G 1/1265; H02G 1/1256; H02G 1/1251; H02G 1/1248; H02G 1/126
USPC ................. 81/9.42, 9.43, 9.44, 9.51; 30/90.1, 30/90.84, 90.8
See application file for complete search history.

(56) References Cited

U.S. PATENT DOCUMENTS

| | | | |
|---|---|---|---|
| 5,140,873 A * | 8/1992 | Schwartzman | 81/9.43 |
| 5,689,874 A * | 11/1997 | College | 29/564.4 |
| 5,809,849 A | 9/1998 | Coffey et al. | |
| 7,140,273 B2 | 11/2006 | Palmowski et al. | |
| 2004/0255723 A1* | 12/2004 | Palmowski et al. | 81/9.51 |

FOREIGN PATENT DOCUMENTS

| | | |
|---|---|---|
| CN | 101431223 B | 8/2011 |
| TW | 330351 | 4/1998 |
| TW | 456521 | 9/2001 |

* cited by examiner

*Primary Examiner* — Robert Scruggs
(74) *Attorney, Agent, or Firm* — Novak Druce Connolly Bove + LLP

(57) ABSTRACT

A cable stripping device includes a mounting seat, a slice mechanism and a cutting mechanism. The slice mechanism is slidably mounted on the mounting seat and capable of slicing a dielectric material of a cable along a axial direction of the cable and dividing the cable into a plurality of strips. The cutting mechanism is mounted on the mounting seat adjacent to the slice mechanism. The cutting mechanism includes a pair of cutting members, the pair of cutting members are capable of moving toward each other to cut the plurality of strips along a radial direction of the cable to enable the plurality of strips separate from the cable.

17 Claims, 5 Drawing Sheets

CABLE STRIPPING DEVICE

BACKGROUND

1. Technical Field

The present disclosure relates to cutting devices, and particularly to a cable stripping device for stripping isolation material or dielectric material surrounding the inner metallic conductor within a cable or a wire.

2. Description of Related Art

A knife can be employed to strip cables manually. However, the process is labor-intensive and generally not efficient. Furthermore, an inner metallic conductor of the cable may be easily damaged by the knife. Other cable stripping devices may be more efficient but may not be able to remove dielectric material from a thick cable of a heavy caliber.

Therefore, there is room for improvement in the art.

BRIEF DESCRIPTION OF THE DRAWINGS

The components in the drawings are not necessarily drawn to scale, the emphasis instead placed upon clearly illustrating the principles of the present disclosure. Moreover, in the drawings, like reference numerals designate corresponding parts throughout the several views.

DETAILED DESCRIPTION

Figure 1:
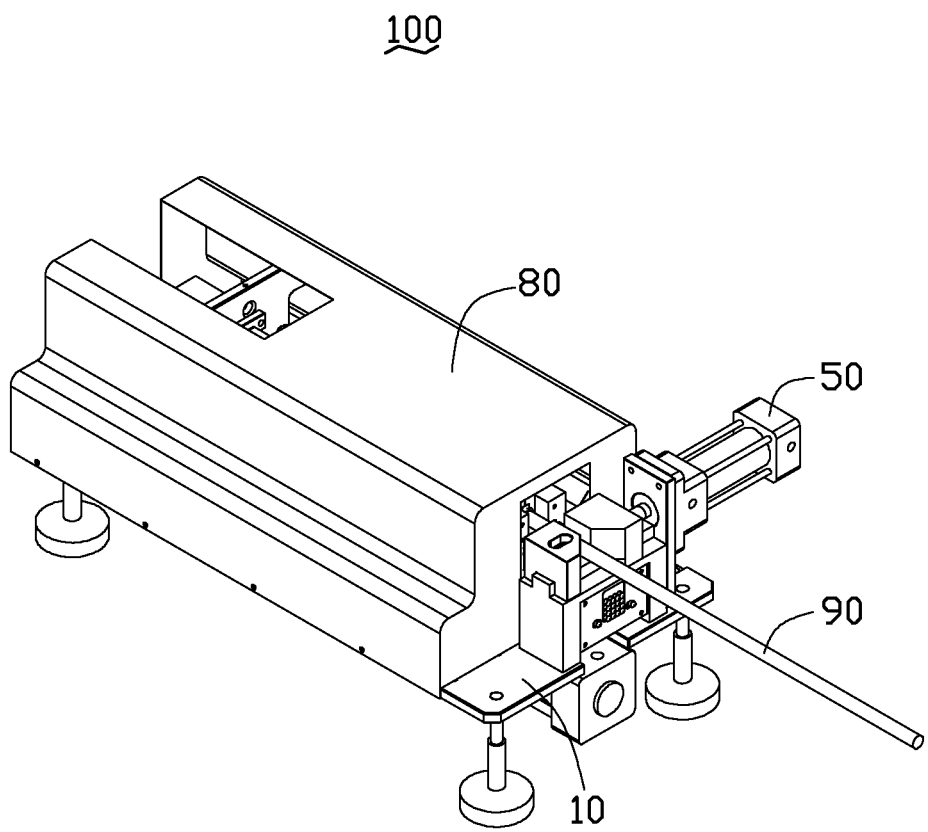
FIG. 1 is an isometric view of an embodiment of a cable stripping device.
Figure 2:
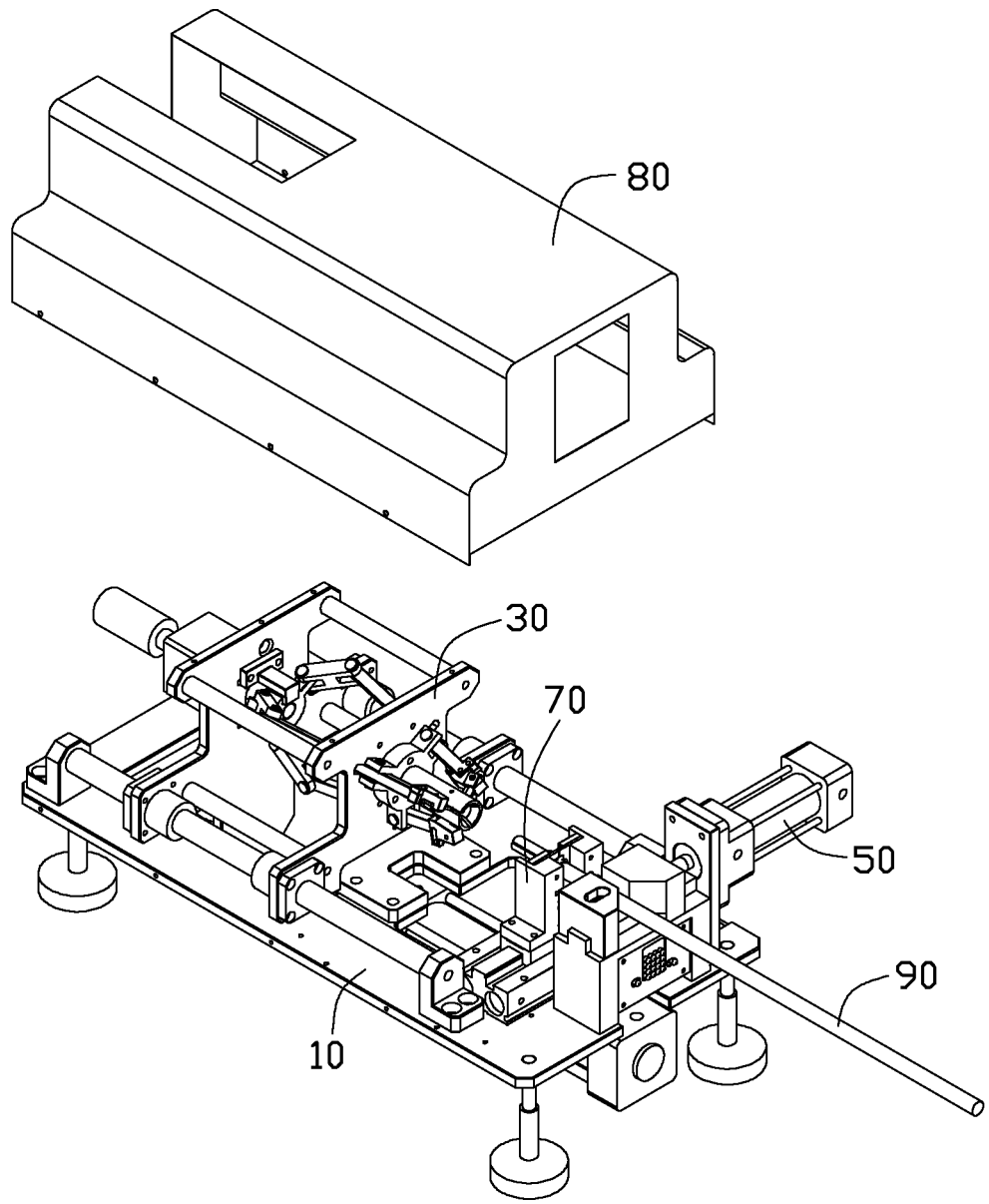
FIG. 2 is a partial disassembled, isometric view of the cable stripping device of FIG. 1 in a use state.
Figure 3:
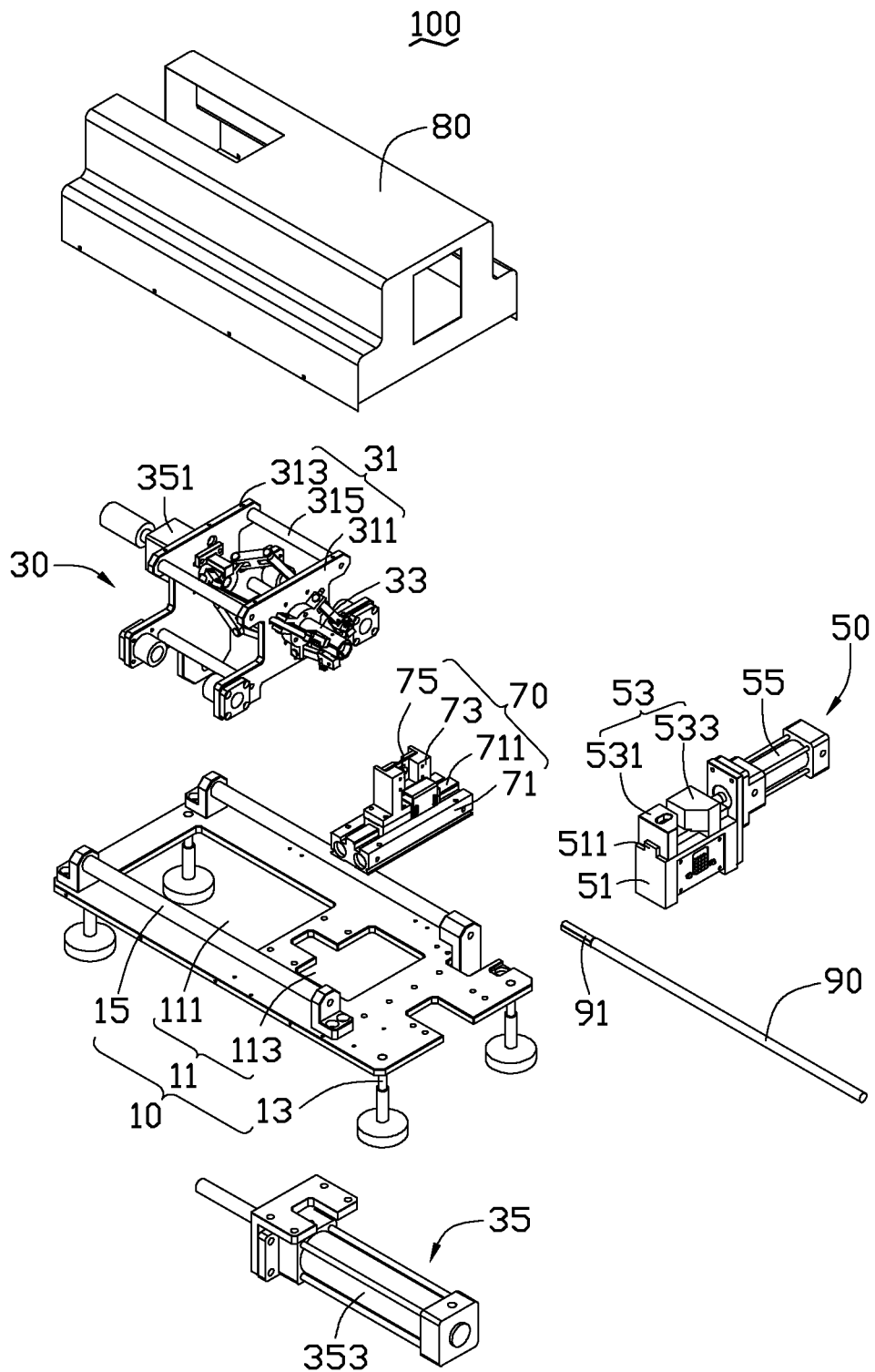
FIG. 3 is an exploded, isometric view of the cable stripping device of FIG. 1.

Referring to FIGS. 1 through 3, an embodiment of a cable stripping device 100 is employed to strip an dielectric material surrounding of an connecting end 91 of a cable 90. The cable 90 is relative thick and has a heavy caliber. The cable stripping device 100 includes a mounting seat 10, a slice mechanism 30, a clamping mechanism 50, a cutting mechanism 70 and a cover 80. The slice mechanism 30 is slidably mounted on the mounting seat 10 to slice the dielectric material of the connecting end 91 into a plurality of strips. The clamping mechanism 50 is mounted on the mounting seat 10 opposite to the slice mechanism 30 to clamp the cable 90. The cutting mechanism 70 is mounted on the mounting seat 10 between the slice mechanism 30 and the clamping mechanism 50. The cutting mechanism 70 is capable of cutting the plurality of strips of the connecting end 91 along a radial direction of the cable 90 to enable the plurality of strips separated from the cable 90. The cover 80 is mounted on the mounting seat 10 to cover the slice mechanism 30, the clamping mechanism 50 and the cutting mechanism 70.

The mounting seat 10 includes a mounting plate 11, a plurality of support rods 13, and a pair of guiding rods 15. The mounting plate 11 is substantially a rectangle plate, and defines a mounting hole 111 and a layout hole 113 therein. The plurality of support rods 13 is mounted on a bottom side of the mounting plate 11 to support the mounting plate 11. The pair of guiding rods 15 are mounted on opposite edges of the mounting plate 11 and is substantially parallel to each other. Each of the pair of guiding rods 15 is mounted adjacent to a side of the mounting plate.

Figure 4:
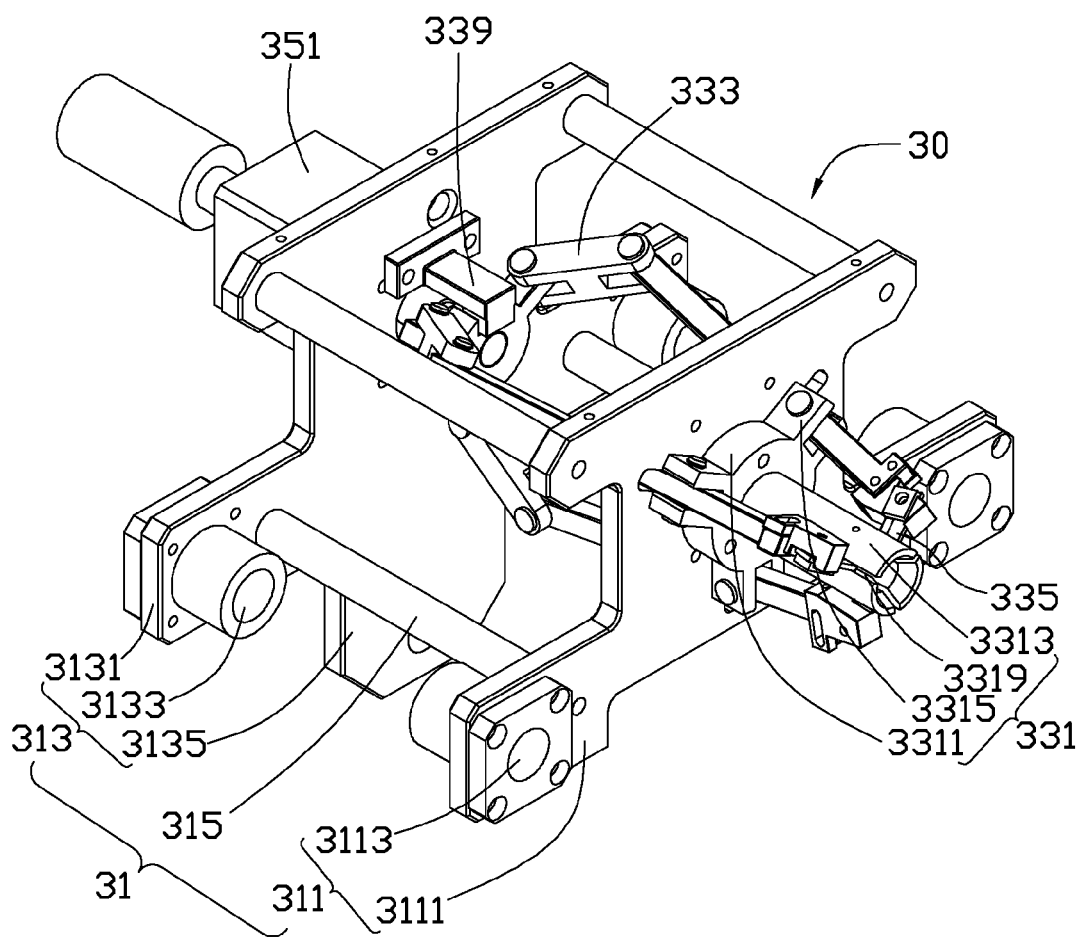
FIG. 4 is an enlarged, isometric view of a slice mechanism of the cable stripping device of FIG. 3.
Figure 5:
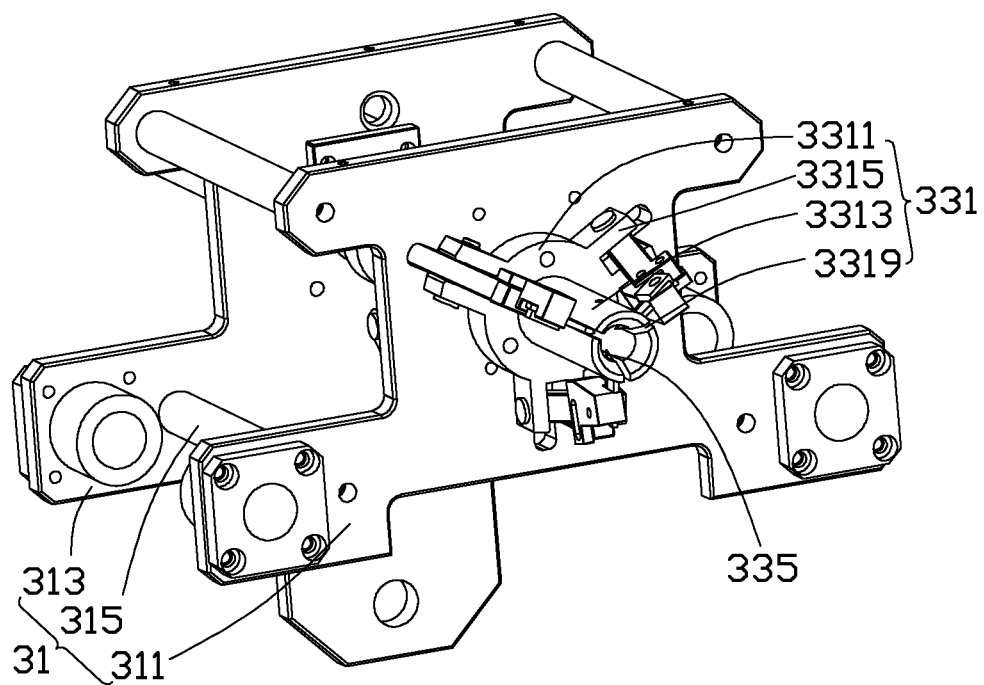
FIG. 5 is similar to FIG. 4, but view from another aspect.

Also referring to FIGS. 4 and 5, the slice mechanism 30 includes a sliding bracket 31, a slice assembly 33 and a driving assembly 35. The sliding bracket 31 is slidably mounted on the pair of guiding rods 15 of the mounting seat 10. The slice assembly 33 and the driving assembly 35 are mounted on opposite ends of the sliding bracket 31. The driving assembly 35 is capable of driving the sliding bracket 31 and the slice assembly 33 to slide along the pair of guiding rods 15.

The sliding bracket 31 includes a first mounting plate 311, a second mounting plate 313, and a plurality of connecting members 315. The first mounting plate 311 and the second mounting plate 313 are substantially parallel to each other. The plurality of connecting members 315 is mounted between the first mounting plate 311 and the second mounting plate 313 to interconnect them. The first mounting plate 311 includes a pair of mounting portions 3111 at opposite sides thereof, each of the pair of mounting portions 3111 defines a sliding hole 3113 thereof. Each of the pair of guiding rods 15 extends into the sliding hole 3113.

The second mounting plate 313 is similar of the first mounting plate 311. The second mounting plate 313 includes a pair of mounting portions 3131 at opposite sides thereof. Each of the pair of mounting portions 3131 defines a siding hole 3133 thereof. Each of the pair of guiding rods 15 extends into the sliding hole 3133. The second mounting plate 313 further includes a pushing portion 3135 between the pair of mounting portions 3131. The pushing portion 3135 extends though the mounting hole 111 of the mounting seat 10 and connects with the driving assembly 35.

The slice assembly 33 includes a receiving bracket 331, a rod assembly 333, a plurality of blades 335, and a position member 339. The receiving bracket 331 is mounted on the first mounting plate 311, includes a base 3311 and a receiving sleeve 3313 protruded from the base 3311. The base 3311 is substantially in a cylindrical shape, and fixed to the first mounting plate 311. The base 3311 includes a plurality of pivotal portions 3315 extending outwardly along a radial direction of the base 3311. The receiving sleeve 3313 is a cylindrical shell and extends away from the first mounting plate 311 perpendicularly. The receiving sleeve 3313 defines a plurality of receiving slots 3319 along a periphery thereof to receive the plurality of blades 335. Each of the receiving sleeve 3313 extends along an axial direction of the receiving sleeve 3313.

The rod assembly 333 extends through the first mounting plate 311 and the second mounting plate 313. And end of the rod assembly 333 connects with the driving assembly 35, an opposite end of the rod assembly 333 extends into the pivotal portion 3315 of the base 3311

The plurality of blades 335 is connected to the end of the rod assembly 333 adjacent to the pivotal portion 3315. The plurality of blades 335 is partially received in the plurality of receiving slots 3319 respectively for slicing the dielectric along an axial direction.

The position member 339 is fixed to the second mounting plate 313 between the first mounting plate 311 and the second mounting plate 313. The position member 339 engages with the rod assembly 333 to position the rod assembly 333.

The driving assembly 35 includes a first driving member 351 and a second driving member 353. The first driving member 351 is mounted on the second mounting plate 313 and connects with the rod assembly 333 to drive the plurality of blades 335 to slice the dielectric material cable along a radial direction. The second driving member 353 is located below the mounting seat 10 and connected to the pushing portion 3135 of the second mounting plate 313. The second driving member 353 is capable of driving the sliding bracket 31 and the rod assembly 333 to slide along the pair of guiding rods 15, thus drives the plurality of blades 335 to slice the dielectric material into a plurality of strips.

The clamping mechanism 50 is mounted on the mounting plate 11 adjacent to an end of the layout hole 113 which opposite to the slice mechanism 30. The clamping mechanism 50 includes a bearing seat 51, a clamping assembly 53, and a driver 55. The bearing seat 51 is a rectangular block and fixed to the mounting seat 10. The bearing seat 51 includes a guiding rail 511. The clamping assembly 53 includes a first clamping block 531 fixed to an end of the guiding rail 511, and a second clamping block 533 slidably mounted on the guiding rail 511. The driver 55 is mounted on an end of the bearing seat 51 and connected to the second clamping block 533. The driver 55 is capable of driving the second clamping block 533 to move toward the first clamping block 531 to clamp the cable 90.

The cutting mechanism 70 is mounted on the mounting seat 10 adjacent to the layout hole 113. The cutting mechanism 70 includes a driver 71, a pair of sliding blocks 73 and a pair of cutting members 75. The driver 71 is mounted on the mounting seat 10, and includes a guiding rail 711 substantially perpendicular to the pair of guiding rods 15. The pair of sliding blocks 73 are slidably mounted on the guiding rail 711 and opposite to each other. The pair of cutting members 75 are fixed to the pair of sliding blocks 73 respectively. The pair of sliding blocks 73 are capable of driving the pair of cutting members 75 to move toward each other to cut the plurality of strips of the cable 90 along a radial direction. In the embodiment, the cutting members 72 are hemicycle blades.

When in assembly, the clamping mechanism 50 is mounted on an end of the mounting plate 11 of the mounting seat 10. The cutting mechanism 70 is mounted on the mounting plate 11 adjacent to the clamping mechanism 50. The sliding bracket 31 is slidably mounted on the pair of guiding rods 15 of the mounting seat 10. The cover 80 is mounted on the mounting seat 10 and covers the slice mechanism 30, the clamping mechanism 50 and the cutting mechanism 70.

Referring to FIGS. 2 and 3 again, when in use, the cable 90 extends through the clamping mechanism 50 and the cutting mechanism 70, then the connecting end 91 of the cable 90 is received in the receiving sleeve 331. The second clamping block 533 is driven by the driver 55 to move toward the first clamping block 531 and then tightly clamps the cable 90. The rod assembly 333 is driven by the first driving member 351 and drives the plurality of blades 335 cut into the dielectric material of the connecting end 91. The second driving member 353 drives the sliding bracket 31 to slide along the pair of guiding rods 15, and the sliding bracket 31 drives the plurality of blades 335 to slide along an axial direction of the cable 90. The dielectric material of the connecting end 91 is then sliced into a plurality of strips. The pair of sliding blocks 73 are driven by the driver 71 and moves toward each other, thus the pair of cutting members 75 are moved toward each other to cut the plurality of strips along a radial direction. The plurality of strips is then separated from the cable 90 and fall into the layout hole 113.

The cable stripping device 100 slices the dielectric material of the cable 90 into a plurality of strips via the slice mechanism 30, and cuts the plurality of strips to enable the plurality of strips separated from the cable 90. Thus the cable stripping device 100 is capable of stripping dielectric material of thick cable of heavy caliber.

Finally, while various embodiments have been described and illustrated, the disclosure is not to be construed as being limited thereto. Various modifications can be made to the embodiments by those skilled in the art without departing from the true spirit and scope of the disclosure as defined by the appended claims.

What is claimed is:

1. A cable tripping device, comprising:
a mounting seat,
a slice mechanism slidably mounted on the mounting seat, the slice mechanism adapted to slice a dielectric material of a cable along an axial direction of the cable and to divide the dielectric material into a plurality of strips, the slice mechanism comprising:
a sliding bracket slidably mounted on the mounting seat,
a slice assembly comprising:
a receiving bracket mounted on the sliding bracket, the receiving bracket comprising:
a base fixed to the sliding bracket, and
a receiving sleeve protruding from the base, the receiving sleeve extending away from the sliding bracket for receiving an end of the cable, a plurality of receiving slots defined along a periphery of the receiving sleeve, each of the plurality of receiving slots extending along an axial direction of the receiving sleeve, and
a plurality of blades partially received in the plurality of receiving slots,
a driving assembly, the slice assembly and the driving assembly mounted on opposite ends of the sliding bracket, the driving assembly adapted to drive the plurality of blades to slice the dielectric material, and
a cutting mechanism mounted on the mounting seat adjacent to the slice mechanism, wherein the cutting mechanism comprises a pair of cutting members, the pair of cutting members are adapted to move toward each other and to cut the plurality of strips along a radial direction of the cable so that the plurality of strips is separated from the cable.

2. The cable stripping device of claim 1, further comprising a clamping mechanism mounted on the mounting seat, the cutting mechanism is located between the clamping mechanism and the slice mechanism, the clamping mechanism is adapted to clamp the cable.

3. The cable stripping device of claim 2, wherein the clamping mechanism comprises a bearing seat, a clamping assembly and a driver, the bearing seat is fixed to the mounting seat, the clamping assembly comprises a first clamping block and a second clamping block, the first clamping block is fixed to an end of the bearing seat, the second clamping block is slidably mounted on the bearing seat, and the driver is mounted on the bearing seat and connected to the second clamping block.

4. The cable stripping device of claim 3, wherein the slice assembly further comprises, a rod assembly, the rod assembly is mounted on the sliding bracket, an end of the rod assembly connects with the driving assembly, an opposite end of the rod assembly connects with the plurality of blades.

5. The cable stripping device of claim 4, wherein the sliding bracket comprises a first mounting plate, a second mounting plate and a plurality of connecting members, the first mounting plate and the second mounting plate are parallel to each other, the first mounting plate and the second mounting plate are connected to each other via the plurality of connecting members mounted between the first mounting plate and the second mounting plate, the rod assembly extends through the first mounting plate and the second mounting plate, and the receiving bracket is fixed to the first mounting plate.

6. The cable stripping device of claim 5, wherein the base is fixed to the first mounting plate, the receiving sleeve extends away from the first mounting plate perpendicularly.

7. The cable stripping device of claim 6, wherein the base comprises a plurality of pivotal portions extending outwardly along a radial direction thereof, an end of the rod assembly extends into the plurality of pivotal portions of the base, the plurality of blades is connected to the end of the rod assembly adjacent to the plurality of pivotal portions.

8. The cable stripping device of claim 5, wherein the first mounting plate comprises a pair of mounting portions at opposite sides thereof, each of the pair of mounting portions of the first mounting plate defines a sliding hole thereof, the second mounting plate comprises a pair of mounting portions at opposite sides thereof, each of the pair of mounting portions if the second mounting plate defines a siding hole thereof, the mounting seat comprises a pair of guiding rods parallel to each other, each of the pair of guiding rods extends into the sliding hole of the first mounting plate and the sliding hole of the second mounting plate so that the sliding bracket is adapted to slide along the pair of guiding rods.

9. The cable stripping device of claim 1, wherein the cutting mechanism further comprises a driver and a pair of sliding blocks, the driver is mounted on the mounting seat and comprises a guiding rail perpendicular to the cable, the pair of sliding blocks are slidably mounted on the guiding rail and opposite to each other, each of the pair of cutting members is fixed to each of the pair of sliding blocks, the pair of sliding blocks are driven by the driver and are adapted to drive the pair of cutting members to move toward each other to cut the cable.

10. A cable stripping device, comprising:
a mounting seat,
a slice mechanism slidably mounted on the mounting seat, wherein the slice mechanism comprises a sliding bracket mounted on the mounting seat, a slice assembly and a driving assembly, the slice assembly comprises a receiving bracket, a rod assembly and a plurality of blades, the receiving bracket comprises a base fixed to the sliding bracket and a receiving sleeve protruding from the base, the receiving sleeve extends away from the sliding bracket for receiving an end of the cable, the receiving sleeve defines a plurality of receiving slots along a periphery of the receiving bracket, the rod assembly is mounted on the sliding bracket, an end of the rod assembly connects with the driving assembly, an opposite end of the rod assembly connects with the plurality of blades, each of the plurality of blades is partially received in each of the plurality of receiving slots, the driving assembly is adapted to drive the plurality of blades to slice a dielectric material of a cable received in the receiving sleeve into a plurality of strips, and
a cutting mechanism mounted on the mounting seat adjacent to the slice mechanism, the cutting mechanism being adapted to cut the plurality of strips so that the plurality of strips is separated them from the cable.

11. The cable stripping device of claim 10, further comprising a clamping mechanism mounted on the mounting seat, the cutting mechanism is located between the clamping mechanism and the slice mechanism, the clamping mechanism is adapted to clamp the cable.

12. The cable stripping device of claim 11, wherein the clamping mechanism comprises a bearing seat, a clamping assembly and a driver, the bearing seat is fixed to the mounting seat, the clamping assembly comprises a first clamping block and a second clamping block, the first clamping block is fixed to an end of the bearing seat, the second clamping block is slidably mounted on the bearing seat, the driver is mounted on the bearing seat and connected to the second clamping block.

13. The cable stripping device of claim 12, wherein the sliding bracket comprises a first mounting plate, a second mounting plate and a plurality of connecting members, the first mounting plate and the second mounting plate are parallel to each other, the first mounting plate and the second mounting plate are connected to each other via the plurality of connecting members mounted between the first mounting plate and the second mounting plate, the rod assembly extends through the first mounting plate and the second mounting plate, and the receiving bracket is fixed to the first mounting plate.

14. The cable stripping device of claim 13, wherein the base is fixed to the first mounting plate, the receiving sleeve extends away from the first mounting plate perpendicularly.

15. The cable stripping device of claim 14, wherein the base comprises a plurality of pivotal portions extending outwardly along a radial direction thereof, an end of the rod assembly extends into the plurality of pivotal portions of the base, the plurality of blades is connected to the end of the rod assembly adjacent to the plurality of pivotal portions.

16. The cable stripping device of claim 13, wherein the first mounting plate comprises a pair of mounting portions at opposite sides thereof, each of the pair of mounting portions of the first mounting plate defines a sliding hole thereof, the second mounting plate comprises a pair of mounting portions at opposite sides thereof, each of the pair of mounting portions of the second mounting plate defines a siding hole thereof, the mounting seat comprises a pair of guiding rods parallel to each other, each of the pair of guiding rods extends into the sliding hole of the first mounting plate and the sliding hole of the second mounting plate so that the sliding bracket is adapted to slide along the pair of guiding rods.

17. The cable stripping device of claim 10, wherein the cutting mechanism comprises a driver, a pair of sliding blocks and a pair of cutting members, the driver is mounted on the mounting seat and comprises a guiding rail perpendicular to the cable, the pair of sliding blocks are slidably mounted on the guiding rail and opposite to each other, each of the pair of cutting members is fixed to each of the pair of sliding blocks, the pair of sliding blocks are driven by the driver and are adapted to drive the pair of cutting members to move toward each other to cut a cable.

* * * * *